United States Patent
Iwasaki et al.

(10) Patent No.: US 9,824,449 B2
(45) Date of Patent: Nov. 21, 2017

(54) OBJECT RECOGNITION AND PEDESTRIAN ALERT APPARATUS FOR A VEHICLE

(71) Applicant: HONDA MOTOR CO., LTD., Minato-Ku, Tokyo (JP)

(72) Inventors: Shun Iwasaki, Saitama (JP); Keisuke Miyagawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 80 days.

(21) Appl. No.: 14/751,305

(22) Filed: Jun. 26, 2015

(65) Prior Publication Data

US 2015/0379372 A1   Dec. 31, 2015

(30) Foreign Application Priority Data

Jun. 30, 2014 (JP) .................. 2014-134669

(51) Int. Cl.
   *G06K 9/00* (2006.01)
   *G06T 7/00* (2017.01)
   *G06T 7/73* (2017.01)

(52) U.S. Cl.
   CPC ........ *G06T 7/0042* (2013.01); *G06K 9/00362* (2013.01); *G06K 9/00805* (2013.01); *G06T 7/73* (2017.01); *G06T 2207/10016* (2013.01); *G06T 2207/30261* (2013.01)

(58) Field of Classification Search
   None
   See application file for complete search history.

(56) References Cited

U.S. PATENT DOCUMENTS

| 5,805,718 A | 9/1998 | Inoshiri et al. |
| 7,130,448 B2 | 10/2006 | Nagaoka et al. |
| 2010/0283845 A1* | 11/2010 | Yokochi ............. G06K 9/00805 348/135 |

(Continued)

FOREIGN PATENT DOCUMENTS

| DE | 10301468 A1 | 10/2003 |
| EP | 2202708 A1 | 6/2010 |

(Continued)

OTHER PUBLICATIONS

Search Report dated Jan. 24, 2017 of the counterpart German Patent Application No. 10 2015 211 871.1.

(Continued)

*Primary Examiner* — Tahmina Ansari
(74) *Attorney, Agent, or Firm* — Carrier Blackman & Associates, P.C.; Joseph P. Carrier; Jeffrey T. Gedeon

(57) ABSTRACT

An object recognition apparatus 10 includes a candidate image extraction unit 12 that extracts a candidate image part 22, which is an image part of an object, from a pickup image 21 of a camera 2, and a candidate image determination unit 14 that determines the type of object of the candidate image part 22 in a determination area $R'_1$ on the basis of whether or not a first predetermined number k or more of the candidate image parts 22, which have been extracted by the candidate image extraction unit 12, have been extracted in the determination area $R'_1$, the width in the horizontal direction of which is a predetermined width or less, in the pickup image 21.

14 Claims, 5 Drawing Sheets

(56) References Cited

U.S. PATENT DOCUMENTS

2010/0284590 A1* 11/2010 Peng ............... A61B 6/032
382/128
2015/0086077 A1* 3/2015 Du ............... G06K 9/00369
382/104

FOREIGN PATENT DOCUMENTS

EP           2579229 A1    4/2013
JP       2007-279808 A    10/2007

OTHER PUBLICATIONS

Office Action dated Jan. 25, 2017 of the counterpart German Patent Application No. 10 2015 211 871.1.

* cited by examiner

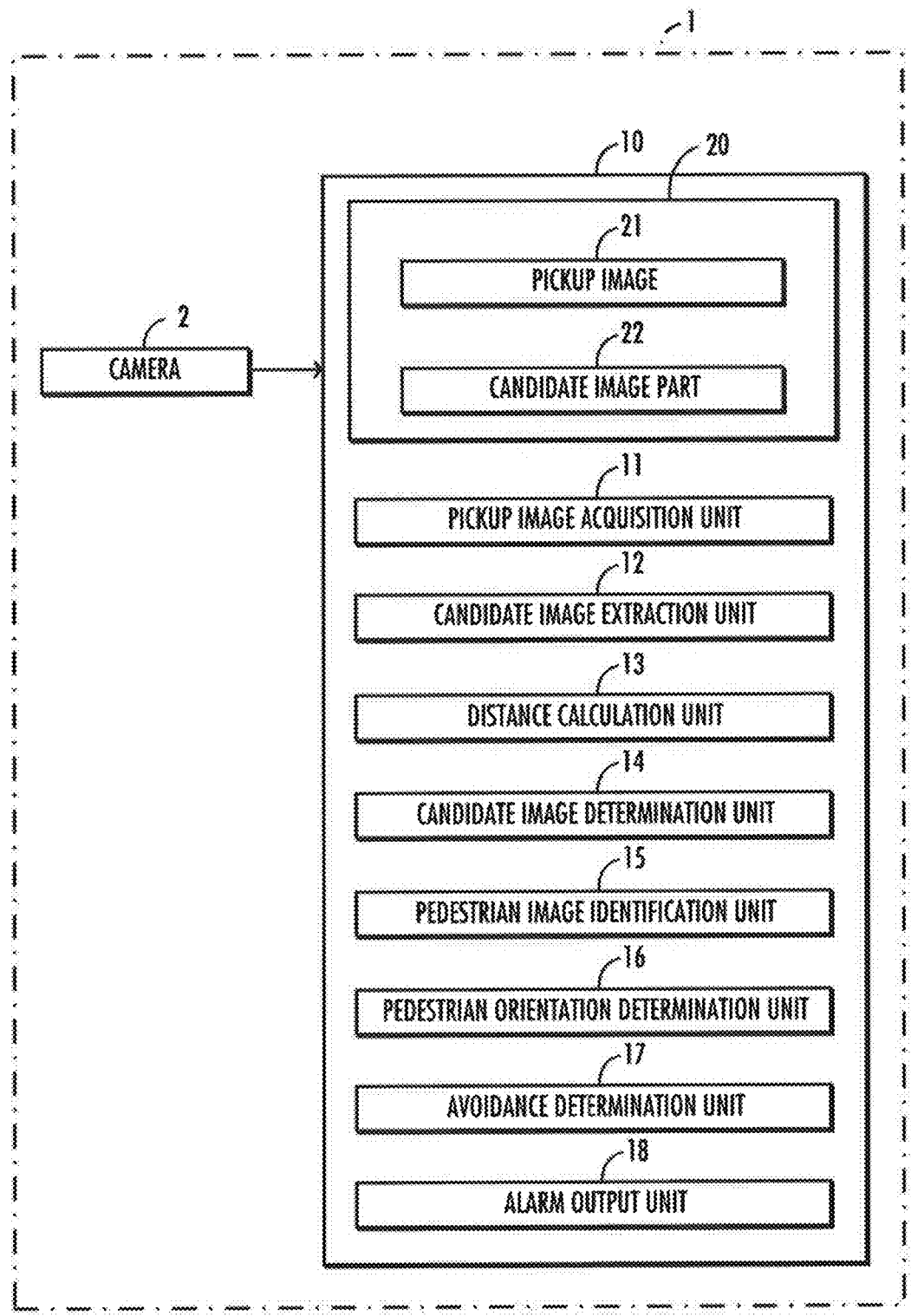

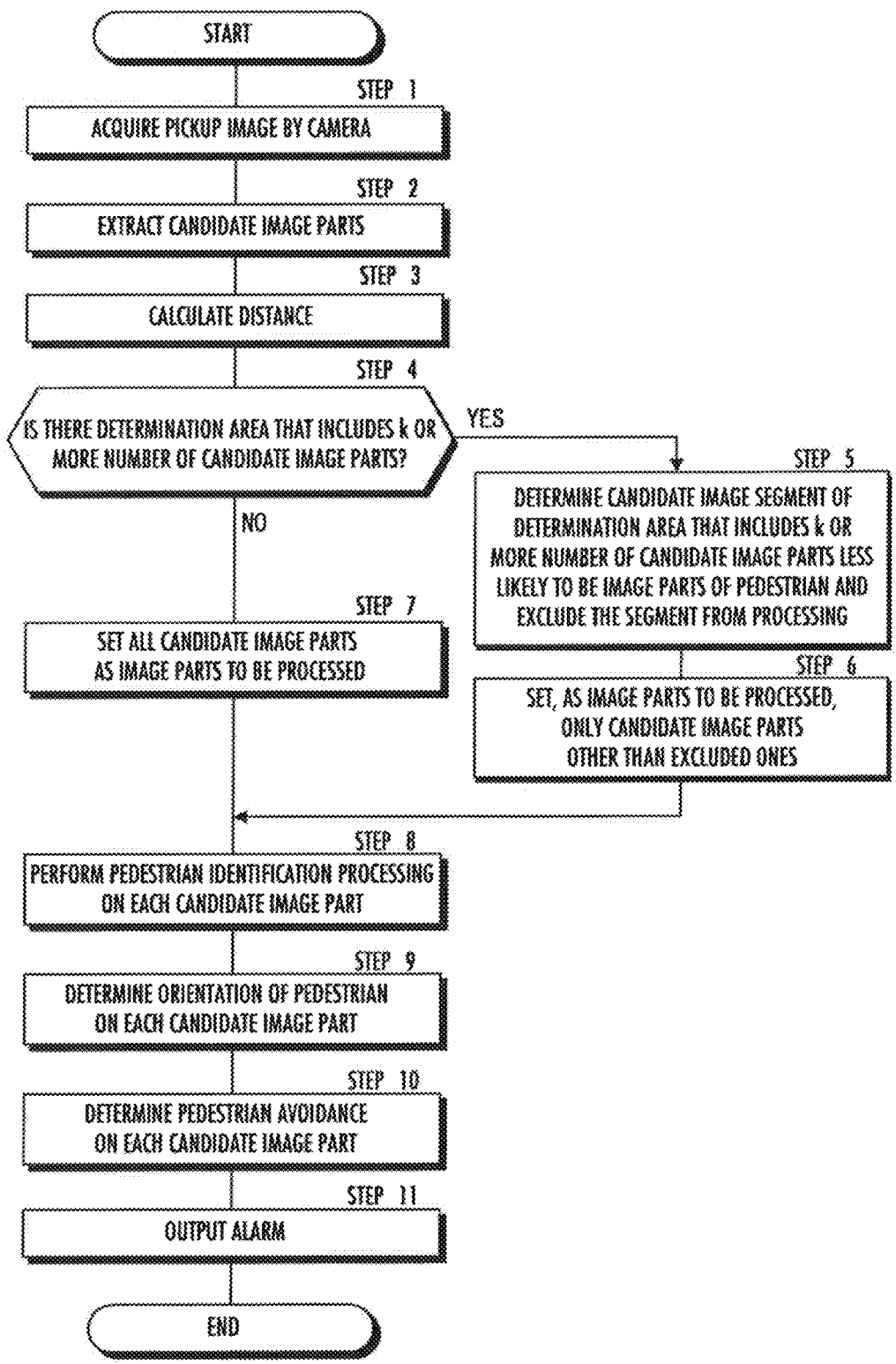

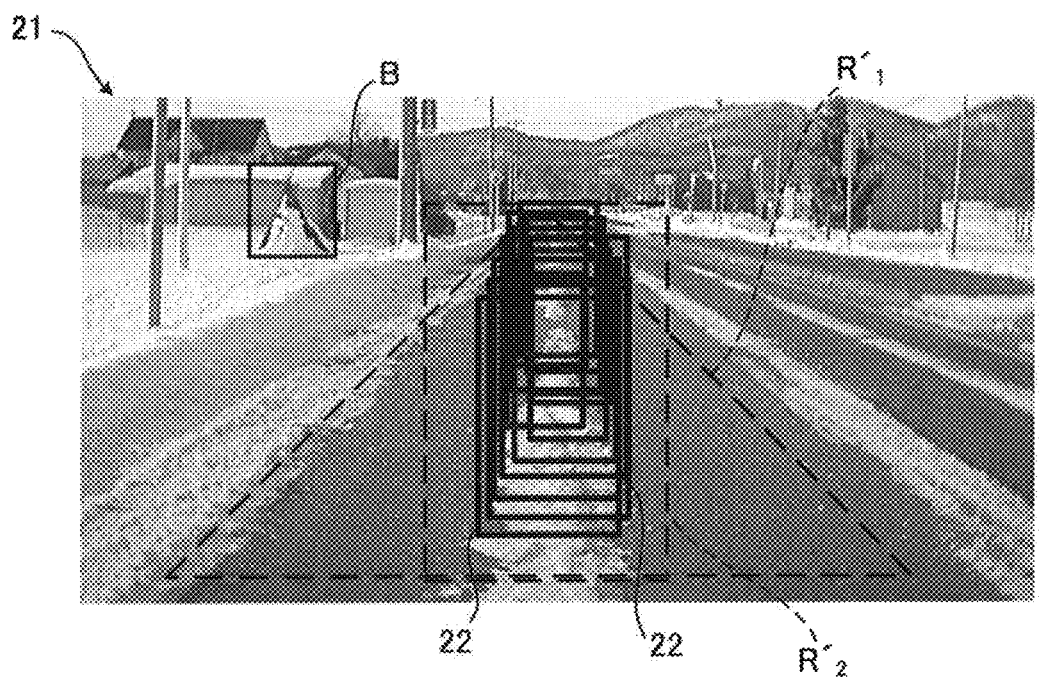

OBJECT RECOGNITION AND PEDESTRIAN ALERT APPARATUS FOR A VEHICLE

CROSS-REFERENCE TO RELATED APPLICATIONS

The present application claims priority under 35 USC 119 to Japanese Patent Application No. 2014-134669 filed Jun. 30, 2014 the entire contents of which are hereby incorporated by reference.

BACKGROUND OF THE INVENTION

Field of the Invention

The present invention relates to an object recognition apparatus configured to recognize an object on the basis of a pickup image of a camera.

Description of the Related Art

Hitherto, there has been known an object recognition apparatus adapted to recognize a pedestrian, contact with whom is to be avoided by a vehicle, from an image of a road ahead of the vehicle acquired by a camera mounted in the vehicle (refer to, for example, Japanese Patent Application Laid-Open No. 2007-27908).

According to the object recognition apparatus described in the foregoing publication, an image part of an object existing around a vehicle (a candidate of an image part of a pedestrian) is extracted from an image acquired by a camera, and then it is identified whether or not the image part of the object is an image part of a pedestrian. Thereafter, the orientation of the pedestrian in the image part that has been identified as the image part of the pedestrian is determined, and it is further determined whether the contact of the vehicle with the object is to be avoided. Then, a notice is given to a driver on the basis of the result of the determination.

An identifying technique as a method of identifying whether or not the image part of an object is the image part of a pedestrian is based on the characteristics indicating the shape of an object, such as the aspect ratio of the image part of an object, the ratio between the area of the image part of the object and the area of a circumscribed quadrangle of the image part of the object, or the characteristics, such as the size of the image part of the object and the luminance dispersion on a grayscale image.

However, when recognizing a pedestrian from a pickup image of a camera, if multiple candidates of the image parts of the pedestrian are extracted, then each of the candidates has to be checked to identify whether or not the candidate is the image part of the pedestrian, thus presenting a problem of prolonged time required for recognizing the pedestrian.

SUMMARY OF THE INVENTION

The present invention has been made in view of the aforesaid background, and an object of the invention is to provide an object recognition apparatus capable of shortening the time required for recognizing an object when multiple candidates of an image part of the object are extracted from a pickup image of a camera.

An object recognition apparatus in accordance with the present invention includes:

a candidate image extraction unit that extracts a candidate image part, which is an image part of an object, from a pickup image of a camera; and a candidate image determination unit that determines the type of object of the candidate image part in a determination area based on whether or not a first predetermined number or more of the candidate image parts has been extracted by the candidate image extraction unit in the determination area, a width of the determination area in a horizontal direction in the pickup image being a predetermined width or less.

The object recognition apparatus in accordance with the present invention first extracts a candidate image part, which is an image part of an object, from a pickup image of a camera by a candidate image extraction unit.

Then, the candidate image determination unit determines the type of object of a candidate image part in a determination area on the basis of whether or not a first predetermined number or more of the candidate image parts has been extracted by the candidate image extraction unit in the determination area, the width of the determination area in the horizontal direction in the pickup image being a predetermined width or less.

The object recognition apparatus in accordance with the present invention is capable of determining the type of object of the candidate image part in the determination area by simple arithmetic processing performed by the candidate image determination unit, making it possible to shorten the time required for recognizing an object when multiple candidate image parts are extracted.

The phrase "the determination area, the width of which in the horizontal direction in the pickup image being a predetermined width or less" refers to a determination area having the width thereof in the horizontal direction within a predetermined width in the pickup image or a determination area, the width of which in the horizontal direction orthogonal to an imaging direction of the camera is a predetermined width or less when the pickup image is converted to a real space.

Further, the case where "a first predetermined number or more of the candidate image parts is extracted in the determination area" is exemplified by a case where two ruts, which are the traces of wheels, are formed in a snowy road and then the snow of only the ruts melts, leaving the mass of snow between the two ruts, and the image part of the remaining mass of snow is extracted as a candidate image part.

Further, in the object recognition apparatus in accordance with the present invention, the determination area is preferably an area, a corresponding real space position of which lies within a predetermined width in the horizontal direction orthogonal to an imaging direction of the camera.

Further, in the object recognition apparatus at accordance with the present invention, the determination area may exist in a plurality of numbers in the horizontal direction orthogonal to the imaging direction of the camera, and the candidate image determination unit may perform determination on each of the determination areas.

Further, in the object recognition apparatus in accordance with the present invention, the candidate image determination unit preferably determines that, in the case where the first predetermined number or more of the candidate image parts is extracted in the determination area, the probability of the candidate image part in the determination area being an image part of a pedestrian is low.

This arrangement makes it possible to determine that the probability of the candidate image part in the determination area being the image part of a pedestrian is low.

If the first predetermined number or more of the candidate image parts is extracted in the determination area, then the probability of the candidate image part in the determination area being an image part of a pedestrian is low. This is because, unlike a mass of snow, a pedestrian has a certain height, so that a pedestrian behind another pedestrian on the near side who is closer to the camera is hidden and no image part of the pedestrian behind will be extracted.

The object recognition apparatus in accordance with the present invention preferably includes a pedestrian image identification unit that performs pedestrian identification processing for identifying whether or not candidate image parts, with respect to candidate image parts excluding candidate image parts determined by the candidate image determination unit as having low possibility to be image parts of a pedestrian among candidate image parts extracted by the candidate image extraction unit, are image parts of a pedestrian.

With this arrangement, the pedestrian image identification unit performs the pedestrian identification processing on the remaining candidate image parts after excluding the candidate image parts determined by the candidate image determining unit less likely to be the image parts of a pedestrian among the candidate image parts extracted by the candidate image extraction unit. This makes it possible to reduce the number of candidate image parts to be processed in the pedestrian identification processing, thereby shortening in the time required for identifying a pedestrian.

Further, in the object recognition apparatus provided with the pedestrian image identification unit, the pedestrian image identification unit preferably selects a second predetermined number or less of candidate image parts, the corresponding real space positions of which are within a predetermined distance from the camera, from among candidate image parts which have been determined by the candidate image determination unit as having low possibility to be image parts of a pedestrian, and performs the pedestrian identification processing on the selected candidate image parts.

With this arrangement, if the candidate image parts which have been determined by the candidate image determination unit less likely to be image parts of a pedestrian include an image part of an object that is close to the camera and within a predetermined distance therefrom and highly necessary to monitor, then the pedestrian identification processing can be performed on that particular image part.

Further, the object recognition apparatus in accordance with the present invention may include a distance calculation unit which calculates a distance between a corresponding real space position and a camera on a candidate image part extracted by the candidate image extraction unit, and the candidate image determination unit may determine that a candidate image part which has a corresponding real space position belonging to the determination area has low possibility to be an image part of a pedestrian in a case where the candidate image parts which have corresponding real space positions belonging to the determination area include the first predetermined number or less and a third predetermined number or more of candidate image parts having different distances from the camera among candidate image parts having corresponding real space positions thereof belonging to the determination area, the distances being calculated by the distance calculation unit.

This arrangement makes it possible to determine that a plurality of low-in-height continuous objects arranged in the imaging direction of the camera (e.g. the foregoing mass of snow between ruts) is less likely to be an image part of a pedestrian.

Further, in the object recognition apparatus in accordance with the present invention, the determination may be carried out by using one image acquired at one point of time. Alternatively, however, the determination can be carried out by using a plurality of pickup images continuously acquired over time.

For example, the candidate image determination unit may determine the type of object of candidate image parts in the determination area in the case where the first predetermined number or more of the candidate image parts are extracted in the determination area or an average number of times of extraction of the candidate image parts extracted in the determination area of each of the pickup images is a fourth predetermined number or more in pickup images of a predetermined number or more that have been continuously acquired over time.

Alternatively, the candidate image determination unit may determine the type of object of candidate image parts in the determination area in the case where, in a predetermined number or more pickup images continuously acquired over time, the first predetermined number or more candidate image parts are extracted in the determination area of the pickup image acquired at a first point of time and the first predetermined number or less and a fifth predetermined number or more of the candidate image parts are extracted in the determination area of each of pickup images acquired at different points of time after the first point of time.

According to these methods, the accuracy of the determination of the type of object can be enhanced, as compared with the case where the determination is carried out by using only one pickup image acquired at one point of time.

In this case, the predetermined number of pickup images continuously acquired over time may be changed according to the travel speed of the vehicle in which the camera is mounted.

Further, the candidate image determination unit preferably continues the determination of the type of object until a predetermined time elapses after determining the type of object of the candidate image parts in the determination area.

This arrangement makes it possible to prevent the determination of the type of object from being changed within the predetermined time due to the influence of a noise or the like after the candidate image determination unit determines the type of object of the candidate image parts in the determination area.

BRIEF DESCRIPTION OF THE DRAWINGS

FIG. 1 is a block diagram of an object recognition apparatus;

FIG. 2 is a flowchart of the processing performed by the object recognition apparatus;

FIG. 3 is an explanatory diagram illustrating candidate image parts in a pickup image;

FIG. 4A and FIG. 4B are explanatory diagrams illustrating the processing for calculating a distance, wherein FIG. 4A illustrates a pickup image 21 and FIG. 4B illustrates a method for calculating a distance.

DESCRIPTION OF THE PREFERRED EMBODIMENTS

Figure 4A:
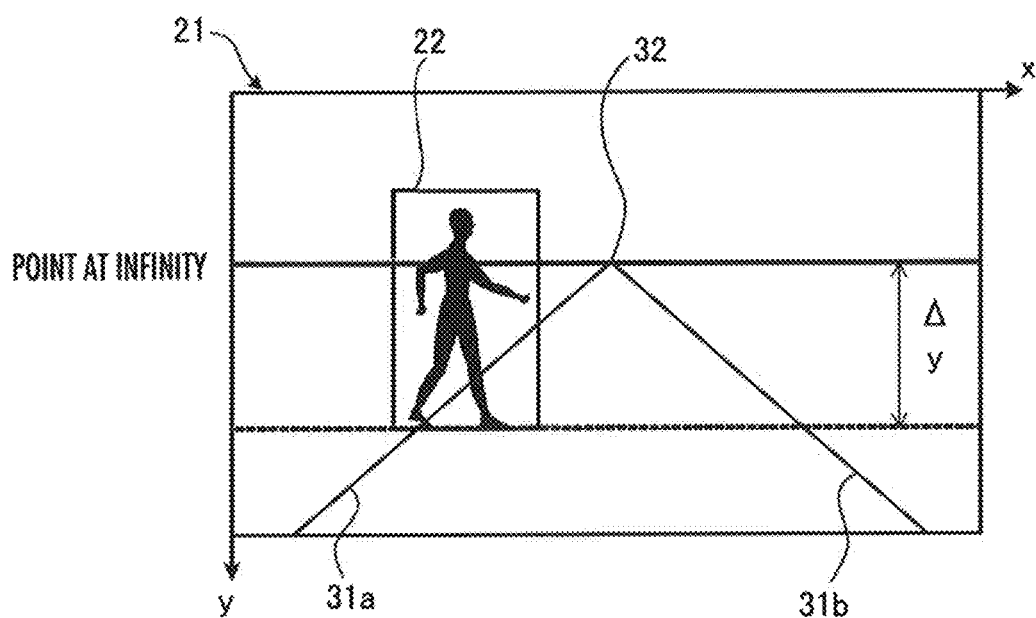

An embodiment of an object recognition apparatus in accordance with the present invention will be described with reference to FIG. 1 to FIG. 5.

Referring to FIG. 1, an object recognition apparatus 10 is mounted in a vehicle 1 provided with a camera 2 (color camera).

The object recognition apparatus 10 is an electronic unit constituted of a CPU, memories, various types of interface circuits and the like (not illustrated), and functions as a pickup image acquisition unit 11, a candidate image extraction unit 12, a distance calculation unit 13, a candidate image determination unit 14, a pedestrian image identification unit 15, a pedestrian orientation determination unit 16, an avoidance determination unit 17, and an alarm output unit 18 by executing an object recognition program, which is retained in a memory, by the CPU.

According to the flowchart given in FIG. 2, the following will describe the processing for recognizing an object (a person, a bicycle or the like) that exists on a road, which is performed by the object recognition apparatus 10. The object recognition apparatus 10 performs the processing at every predetermined control cycle according to the processing in the flowchart given in FIG. 2 to recognize an object (pedestrian) existing on the road on which the vehicle 1 is traveling, determine whether the object is an object with which the vehicle 1 should avoid contact, and notify a driver.

The processing in STEP1 of FIG. 2 is performed by the pickup image acquisition unit 11. The pickup image acquisition unit 11 receives video signals of the surrounding area (front area) of the vehicle 1 output from the camera 2 mounted in the vehicle 1, and subjects the color components (R value, G value, and B value) of the video signals to demosaicing so as to acquire a color pickup image having the R value, G value and the B value as the data of each pixel. The data of the color pickup image in front of the vehicle 1 is retained in an image memory 20. Then, the processing for converting the color component of each pixel of the color pickup image into the degrees of luminance is performed to generate a grayscale pickup image (hereinafter referred to as "the pickup image") 21, and the pickup image is retained in the image memory 20.

The processing in next STEP2 is performed by the candidate image extraction unit 12. The candidate image extraction unit 12 extracts candidate image parts 22, which are image parts of an object that may be a pedestrian, from a pickup image 21. In FIG. 3, for example, illustrates the image parts of the mass of snow extracted as a plurality of candidate image parts 22. The image parts show the snow remaining between two ruts after the two ruts are formed on a snowy road by wheels and only the snow along the ruts has melted.

The candidate image parts 22 are extracted by, for example, searching for areas having the quantity of characteristics of a pedestrian in the pickup image 21. The search for a pedestrian in STEP2 is performed using the data of a simple dictionary (a template of the quantity of characteristics of a pedestrian), which has been set more loosely than in the processing of identifying a pedestrian in STEP8, which will be discussed later.

Subsequently, the processing in STEP3 is performed by the distance calculation unit 13. The distance calculation unit 13 calculates the distance between a corresponding real space position and the camera 2 on each of the candidate image parts 22.

Figure 4B:
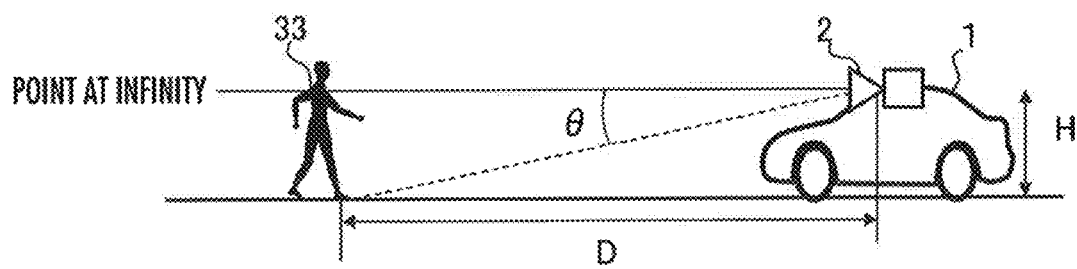

As illustrated in FIG. 4A, the distance calculation unit 13 first determines the coordinate of a road vanishing point 32, which is a point at infinity, from the intersection point of image parts 31a, 31b of lane marks (white lines) that define a driving lane in a pickup image 21 of the camera 2, and determines a difference Δy between the pixel of the road vanishing point 32 and the pixel of the lowest point of the candidate image part 22. Then, as illustrated in FIG. 4B, the distance calculation unit 13 calculates an angle θ relative to the point at infinity according to expression (1) given below and calculates a distance D between the vehicle 1, in which the camera 2 is mounted, and an object 33, i.e. the distance between the vehicle 1 and the corresponding real space position of the candidate image part 22, according to expression (2) given below. H denotes the height of the camera 2 and "focal" denotes the focal distance of the camera 2.

$$\tan \theta = \Delta y/\text{focal} \quad (1)$$

$$D = H/\tan \theta \quad (2)$$

The processing in subsequent STEP4 to STEP7 is performed by the candidate image determination unit 14.

Figure 5:
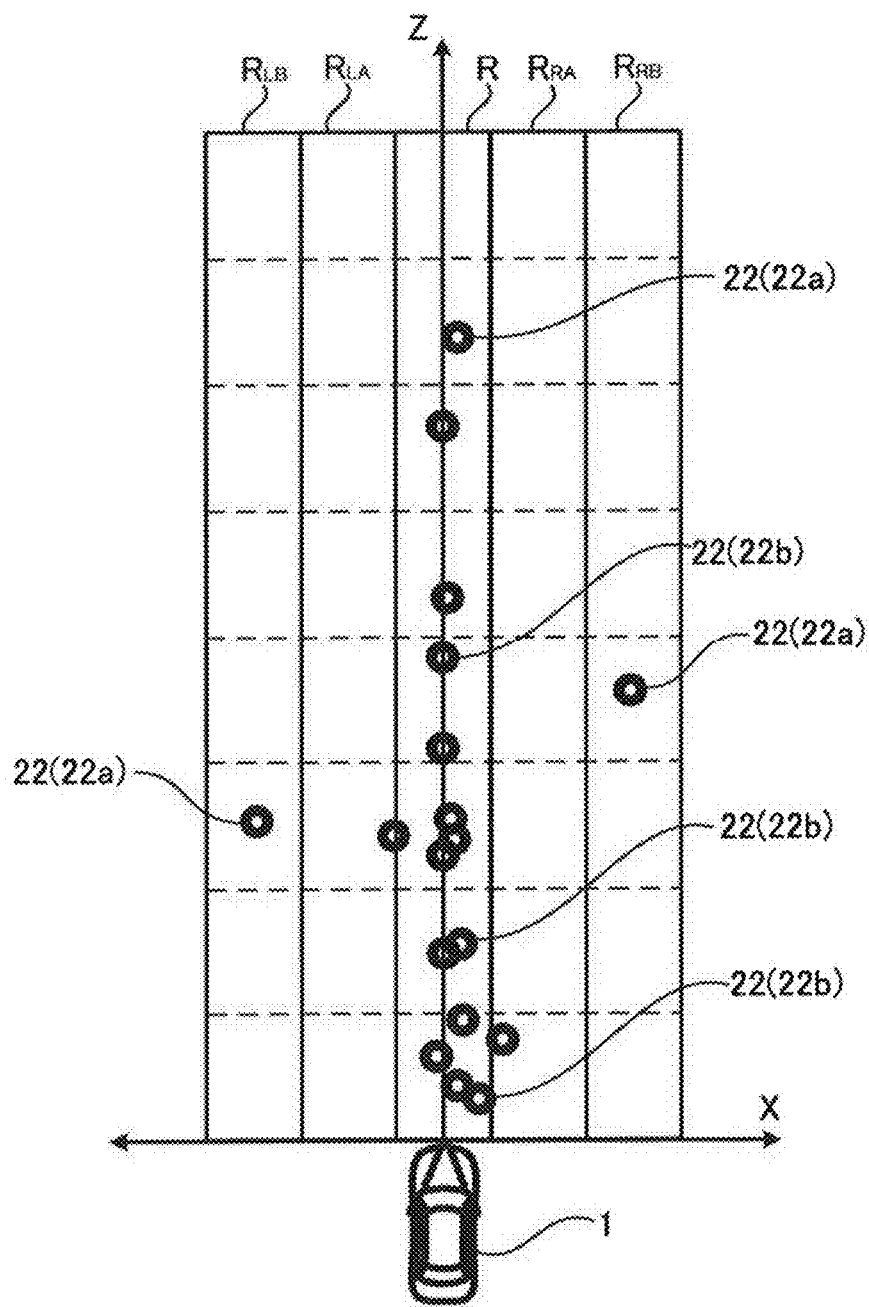
FIG. 5 is an explanatory diagram illustrating positions of coordinates of candidate image parts in a pickup image, which have been converted to real coordinates.

In STEP4, the candidate image determination unit 14 first maps the coordinate positions of the candidate image parts 22 in the pickup image 21 on real coordinates on the basis of the distances calculated by the distance calculation unit 13 and the positions in the horizontal direction in the pickup image 21, as illustrated in FIG. 5.

Next, the candidate image determination unit 14 sets, as a determination area R (the hatched portion in the drawing), an area, the width of which in the horizontal direction orthogonal to the traveling direction of the vehicle 1 (the imaging direction of the camera 2) is within a predetermined width range in FIG. 5. The following will describe a case where there is a single determination area R. Alternatively, however, a plurality of determination areas R may be set.

Subsequently, among the candidate image parts 22 extracted by the candidate image extraction unit 12, the candidate image parts 22, the corresponding real space positions of which belong to the determination area R, are counted. If there is one or more of the determination areas R, each of which includes a k number ("k" corresponding to a first predetermined number in the present invention) or more of the candidate image parts 22 that belong to the determination area R, then the procedure proceeds to STEP5. If there is no determination area R that includes the k number or more of the candidate image parts 22, then the procedure proceeds to STEP7.

In STEP5, the candidate image determination unit 14 determines that the candidate image parts 22 in the determination area R that includes the k number or more of the candidate image parts 22 among the candidate image parts 22 extracted by the candidate image extraction unit 12 are less likely to be image parts of a pedestrian, and proceeds to STEP6, excluding the candidate image parts 22 from those to be processed in STEP8, which will be discussed later.

In STEP6, the candidate image determination unit 14 sets, as the image parts to be processed in STEP8, only the candidate image parts 22 (22a in the drawing) other than the candidate image parts 22 that have been excluded in STEP5, and proceeds to STEP8.

In STEP7, the candidate image determination unit 14 sets, as the image parts to be processed in the next STEP8, all the candidate image parts 22 extracted by the candidate image extraction unit 12 and proceeds to STEP8.

In subsequent STEP8, the processing by the pedestrian image identification unit 15 is performed. The pedestrian image identification unit 15 performs pedestrian identification processing on each of the candidate image parts 22 set as the image parts to be processed in STEP6 or STEP7 so as to identify whether or not the candidate image part 22 is an image part of a pedestrian. The candidate image part 22 that has been determined to be an image part of a pedestrian is subjected to the processing performed in STEP9. If the candidate image part 22 is not determined to be an image part of a pedestrian, then the processing by the object recognition apparatus 10 is terminated.

The pedestrian identification processing is performed by, for example, searching for areas that have the quantity of characteristics of a pedestrian in the pickup image 21.

The processing in STEP9 is performed by the pedestrian orientation determination unit 16. The pedestrian orientation determination unit 16 determines the orientation of a pedestrian on each of the candidate image parts 22 that have been determined to be the image parts of the pedestrian by the pedestrian image identification unit 15.

The processing in subsequent STEP10 is performed by the avoidance determination unit 17. On each of the candidate image parts 22 that have been determined to be the image parts of a pedestrian, it is determined whether or not avoidance is necessary (whether there is a high possibility of collision with the vehicle 1) according to the orientation of the pedestrian determined by the pedestrian orientation determination unit 16. For example, it is determined that avoidance is necessary if the pedestrian is facing forward (toward the vehicle 1) or the pedestrian positioned on the right side of the vehicle 1 is facing leftward (toward the vehicle 1), whereas it is determined that avoidance is not necessary if the pedestrian positioned on the right side of the vehicle 1 is facing rightward (away from the vehicle 1). If the number of the candidate image parts 22 that have been determined to be image parts of an object to be avoided is one or more, then the avoidance determination unit 17 proceeds to STEP11, or if there is no such candidate image part 22, then the processing by the object recognition apparatus 10 is terminated.

The processing in STEP11 is performed by the alarm output unit 18. The alarm output unit 18 outputs an alarm on the candidate image part 22 that has been determined by the avoidance determination unit 17 as an image part of an object to be avoided among the candidate image parts 22 determined to be the image parts of a pedestrian. The alarm may be output in the form of, for example, an audio guidance or display on a display unit.

As described above, according to the object recognition apparatus 10 of the present embodiment, among the candidate image parts 22 extracted by the candidate image extraction unit 12, the candidate image parts 22 in the determination area R that includes the k number or more of the candidate image parts 22 are determined less likely to be the images of a pedestrian and excluded from the processing thereafter. Further, among the candidate image parts 22 extracted by the candidate image extraction unit 12, the processing thereafter (the processing by the pedestrian image identification unit 15 in STEP8) is performed only on the candidate image part 22 (22a) remaining after excluding as described above.

Thus, according to the object recognition apparatus 10 of the present embodiment, when multiple candidate image parts 22 are extracted from the pickup image 21 of the camera 2, the number of the candidate image parts 22 to be subjected to the pedestrian identification processing can be reduced, thus shortening time required for recognizing a pedestrian.

Further, according to the object recognition apparatus 10 of the present embodiment, if it is determined in STEP4 that there is one or more determination areas R, each of which includes the k number or more of the candidate image parts 22, then the procedure proceeds to STEP5. Alternatively, the procedure may proceed to STEP5 if it is determined in STEP4 that there is one or more determination areas R, each of which includes the k number or more of the candidate image parts 22 and also includes an m number or more (m≤k, and m corresponding to a second predetermined number in the present invention) of the candidate image parts 22 that have different distances from the camera 2 (22b in the drawing), the distances being calculated by the distance calculation unit 13.

Further, according to the object recognition apparatus 10 of the present embodiment, in STEP6, only the candidate image parts 22 that remain after the exclusion in STEP5 are set to be processed in the next STEP8 (the pedestrian image identification unit 15). Alternatively, in STEP 6, among the candidate image parts 22 excluded in STEP5, an n number ("n" corresponding to a third predetermined number in the present invention) of the candidate image parts 22 having the corresponding real space positions thereof lying within a predetermined distance may be selected in order, starting with the one closest to the camera 2, and may be added to the image parts to be processed in STEP8. Thus, if the candidate image parts 22 in the determination area R that has the k number or more of the candidate image parts 22 include an image part of an object which is close to the vehicle 1 and highly necessary to monitor, then the pedestrian identification processing can be performed on that particular image part.

Further, according to the object recognition apparatus 10 of the present embodiment, the corresponding real space positions of the candidate image parts 22 are mapped on the real coordinates in FIG. 5, and then the number of the candidate image parts 22 that have the corresponding real space positions lying in the determination area R is counted. As an alternative method, a determination area $R'_1$ corresponding to the determination area R, the real space position of which lies within a predetermined width range in the horizontal direction orthogonal to the traveling direction of the vehicle 1, may be set in the pickup image 21 in FIG. 3, and then the number of the candidate image parts 22 that have the corresponding real space positions included in the determination area $R'_1$ in the pickup image 21 may be counted. Alternatively, a determination area $R'_2$ having the width in the horizontal direction thereof in a predetermined width range may be set in the pickup image 21, and the number of the candidate image parts 22 included in the determination area $R'_2$ in the pickup image 21 may be counted. However, the determination area $R'_1$ is more preferably used than the determination area $R'_2$, because the determination area $R'_2$ includes an image part B of a background that has low connection with the travel of the vehicle 1 in an area distant from the vehicle 1, whereas the determination area $R'_1$ does not include the image part B of the background that has low connection with the travel of the vehicle 1 even in an area distant from the vehicle, as illustrated in FIG. 3.

Further, as illustrated in FIG. 5, determination areas $R_{LA}$, $R_{LB}$ corresponding to the left direction of the vehicle 1 and determination areas $R_{RA}$, $R_{RB}$ corresponding to the right direction of the vehicle 1 may be set as a plurality of the determination areas R. With this arrangement, if, for example, multiple other vehicles are parked on a side of a road (corresponding to the determination area $R_{LB}$ or $R_{RB}$), then the image parts of the parked vehicles can be determined less likely to be the image parts of a pedestrian.

Further, in the object recognition apparatus 10 of the present embodiment, the camera 2 is mounted in the vehicle 1. Alternatively, however, the camera 2 may be a camera installed on a side of a road or above a road.

If it is determined in STEP4 that there is one or more determination areas R, each of which includes the k number or more of the candidate image parts 22, then the procedure proceeds to STEP5; however, the candidate image parts 22 in the determination area R are less likely to be the image segments of a pedestrian. This is because, unlike the mass of snow, a pedestrian has a certain height, so that a pedestrian behind another pedestrian on this side who is closer to the camera 2 is hidden and no image part of the pedestrian behind will be extracted, leading to a low probability that there are as many as the k number of the candidate image parts 22 in the determination area R.

Further, according to the object recognition apparatus 10 of the present embodiment, if there is one or more determination areas R, each of which includes the k number or more of the candidate image parts 22, in a single pickup image 21 acquired at one point of time, then the candidate image determination unit 14 determines in STEP4 to STEP5, that the candidate image parts 22 in the determination area R are less likely to be the image parts of a pedestrian. As an alternative method, a plurality of the pickup images 21 continuously acquired over time may be used to carry out the determination. This method will be described below.

The candidate image determination unit 14 first determines whether or not the number of the candidate image parts 22, the corresponding real space positions of which belong to the determination area R, is the k number or more in a pickup image $21_{t1}$ acquired at a point of time t1.

If the number of the candidate image parts 22 is the k number or more, then the candidate image determination unit 14 determines whether or not the number of the candidate image parts 22, the corresponding real space positions of which belong to the determination area R, is a p number or more ("p" corresponding to a fifth predetermined number in the present invention) in a pickup image $21_{t2}$ acquired at a point of time t2. "p" may be equal to k or smaller than k.

Further, if the number of the candidate image parts 22 is the p number or more, then the candidate image determination unit 14 determines whether or not the number of the candidate image parts 22, the corresponding real space positions of which belong to the determination area R, is the p number or more in a pickup image $21_{t3}$ acquired at a point of time t3.

The candidate image determination unit 14 repeats the above processing, and determines that the candidate image parts 22 that belong to the determination area R are less likely to be the image parts of a pedestrian if the number of the candidate image parts 22, the corresponding real space positions of which belong to the determination area R, is the p number or more in a pickup image $21_{tq}$ acquired at a point of time tq.

According to the method in which a plurality of pickup images $21_{t1}$, $21_{t2}$, $21_{t3}$, . . . , $21_{tq}$ continuously acquired over time as described above are used to determine low probability of image parts being a pedestrian, the accuracy of a determination result can be further enhanced, as compared with the method in which only one pickup image 21 acquired at one point of time is used.

In the method described above, the number of the candidate image parts 22 is determined on a q number ("q" corresponding to a predetermined acquisition number in the present invention) of the pickup images $21_{t1}$, $21_{t2}$, $21_{t3}$, . . . , $21_{tq}$. However, the predetermined acquisition number q of the pickup images 21 may be changed according to the travel speed of the vehicle 1.

For example, the pickup images from $21_{t2}$ and after, namely, the pickup images $21_{t2}$, $21_{t3}$, . . . , $21_{tq}$, in the case where the travel speed is high, capture areas that are farther ahead in terms of the real space positions, as compared with the pickup images $21_{t2}$, $21_{t3}$, . . . , $21_{tq}$ in the case where the travel speed is low. Hence, when determining candidate images on areas at the same distance, the candidate image parts 22 can be reliably extracted even when the predetermined acquisition number q of the pickup image 21 is reduced as the travel speed increases. As a result, in the case where the travel speed is high, a reduced number of pickup images 21 is required to make it possible to determine the low probability of image parts being a pedestrian, thus enabling to shorten time for performing the determination.

Further, the method for determining the low probability of image parts being a pedestrian by using the plurality of the pickup images $21_{t1}$, $21_{t2}$, $21_{t3}$, . . . , $21_{tq}$ continuously acquired over time is not limited to the foregoing methods. For example, the type of object of the candidate image parts 22 in the determination area R may be determined if the k number or more of the candidate image parts 22 is extracted in the determination area R in each of the pickup images $21_{t1}$, $21_{t2}$, $21_{t3}$, . . . , $21_{tq}$, or the average extraction number of the candidate image parts 22 extracted in the pickup images $21_{t1}$, $21_{t2}$, $21_{t3}$, . . . , $21_{tq}$ is an r number or more ("r" corresponding to a fourth predetermined number in the present invention).

Further, in the object recognition apparatus 10 of the present embodiment, the candidate image parts 22 that have once been determined by the candidate image determination unit 14 as an object that is less likely to be a pedestrian in the pickup image 21 acquired at a certain point of time may be determined as an object that is less likely to be a pedestrian also in the pickup images 21 acquired thereafter until a predetermined time elapses from the foregoing point of time. This makes it possible to prevent the result of determination that image parts in the pickup image 21 acquired at a certain point of time are less likely to indicate a pedestrian from being changed within a predetermined time due to the influence of a noise or the like.

What is claimed is:

1. An object recognition apparatus comprising:
   a camera;
   an alert device; and
   an electronic control unit including a processor, wherein the processor is configured to function as:
   a candidate image extraction unit that extracts one or more candidate image parts, each of which is an image part of an object, from a pickup image of the camera; and
   a candidate image determination unit that:
     counts a quantity of candidate image parts present in a determination area, in which a width of the determination area in a horizontal direction in the pickup image is within a predetermined width;
     determines that the quantity of candidate image parts present in the determination area is at least a predetermined number greater than one; and
     excludes, in the case that the quantity of candidate image parts present in the determination area is at least a predetermined number greater than one, the quantity of candidate image parts in the determination area from the one or more candidate image parts for having a low possibility of being image parts of a pedestrian, and
   wherein the processor is further configured to control the alert device based on the determination made by the candidate image determination unit.

2. The object recognition apparatus according to claim 1, wherein the determination area is an area, a corresponding real space position of which lies within a predetermined width in the horizontal direction orthogonal to an imaging direction of the camera.

3. The object recognition apparatus according to claim 1, wherein the determination area exists in a plurality of number in the horizontal direction orthogonal to the imaging direction of the camera, and the candidate image determination unit performs the determination on each of the determination areas.

4. The object recognition apparatus according to claim 1, wherein the processor is further configured to function as a pedestrian image identification unit that performs pedestrian identification processing for identifying whether or not candidate image parts, which remain after excluding candidate image parts determined, by the candidate image determination unit, as having low possibility to be image parts of a pedestrian among candidate image parts extracted by the candidate image extraction unit, are image parts of a pedestrian.

5. The object recognition apparatus according to claim 4, wherein the pedestrian image identification unit selects a second predetermined number or less of candidate image parts, the corresponding real space positions thereof being within a predetermined distance from the camera, from among candidate image parts which have been determined by the candidate image determination unit as having low possibility to be image parts of a pedestrian, and performs the pedestrian identification processing on the selected candidate image parts.

6. The object recognition apparatus according to claim 5, wherein the processor is further configured to function as a distance calculation unit which calculates a distance between a corresponding real space position and the camera on a candidate image part extracted by the candidate image extraction unit, and wherein the candidate image determination unit determines that a candidate image part which has the corresponding real space position belonging to the determination area has low possibility to be an image part of a pedestrian in a case where the candidate image parts which have corresponding real space positions thereof belonging to the determination area include the first predetermined number or less and a third predetermined number or more of candidate image parts having different distances from the camera, the distances being calculated by the distance calculation unit.

7. The object recognition apparatus according to claim 4, wherein the candidate image determination unit maintains the determination result of the type of object until a predetermined time elapses after determining the type of object of the candidate image parts in the determination area.

8. The object recognition apparatus according to claim 1, wherein the processor is further configured to function as a distance calculation unit which calculates a distance between a corresponding real space position and the camera on a candidate image part extracted by the candidate image extraction unit, and wherein the candidate image determination unit determines that a candidate image part which has the corresponding real space position belonging to the determination area has low possibility to be an image part of a pedestrian in a case where the candidate image parts which have corresponding real space positions thereof belonging to the determination area include the first predetermined number or less and a third predetermined number or more of candidate image parts having different distances from the camera, the distances being calculated by the distance calculation unit.

9. The object recognition apparatus according to claim 8, wherein the candidate image determination unit determines the type of object of candidate image parts in the determination area in a case where the first predetermined number or more of the candidate image parts are extracted in the determination area or an average number of times of extraction of the candidate image parts extracted in the determination area of each of the pickup images is a fourth predetermined number or more in each of pickup images of a predetermined number or more that have been continuously acquired over time.

10. The object recognition apparatus according to claim 1, wherein the candidate image determination unit determines the type of object of candidate image parts in the determination area in a case where the first predetermined number or more of the candidate image parts are extracted in the determination area or an average number of times of extraction of the candidate image parts extracted in the determination area of each of the pickup images is a fourth predetermined number or more in each of pickup images of a predetermined number or more that have been continuously acquired over time.

11. The object recognition apparatus according to claim 10, wherein the candidate image determination unit determines the type of object of candidate image parts in the determination area in a case where, in pickup images of a predetermined number or more that have been continuously acquired over time, the first predetermined number or more candidate image parts are extracted in the determination area of the pickup image acquired at a first point of time and the first predetermined number or less and a fifth predetermined number or more of the candidate image parts are extracted in the determination area of each of pickup images acquired at different points of time after the first point of time.

12. The object recognition apparatus according to claim 10, wherein the predetermined number of pickup images continuously acquired over time is changed according to a travel speed of the vehicle in which the camera is mounted.

13. The object recognition apparatus according to claim 1, wherein the candidate image determination unit determines the type of object of candidate image parts in the determination area in a case where, in pickup images of a predetermined number or more that have been continuously acquired over time, the first predetermined number or more candidate image parts are extracted in the determination area of the pickup image acquired at a first point of time and the first predetermined number or less and a fifth predetermined number or more of the candidate image parts are extracted in the determination area of each of pickup images acquired at different points of time after the first point of time.

14. The object recognition apparatus according to claim 1, wherein the candidate image determination unit maintains the determination result of the type of object until a predetermined time elapses after determining the type of object of the candidate image parts in the determination area.

\* \* \* \* \*